United States Patent
Mori

(10) Patent No.: US 9,846,559 B2
(45) Date of Patent: Dec. 19, 2017

(54) SYSTEM, AND POST-PROCESSING APPARATUS AND METHOD FOR CONTROLLING THE SAME

(71) Applicant: CANON KABUSHIKI KAISHA, Tokyo (JP)

(72) Inventor: Yasuo Mori, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/092,077

(22) Filed: Apr. 6, 2016

(65) Prior Publication Data
US 2016/0299732 A1    Oct. 13, 2016

(30) Foreign Application Priority Data

Apr. 10, 2015 (JP) .................................. 2015-081161
Mar. 8, 2016 (JP) .................................. 2016-044984

(51) Int. Cl.
*G06F 15/00* (2006.01)
*G06F 3/12* (2006.01)

(52) U.S. Cl.
CPC .......... *G06F 3/1264* (2013.01); *G06F 3/1211* (2013.01); *G06F 3/1282* (2013.01)

(58) Field of Classification Search
CPC .... G06F 3/1274; G06F 3/1293; G06F 3/1208; G06F 3/1264
USPC ................................................ 358/1.13–1.15
See application file for complete search history.

(56) References Cited

U.S. PATENT DOCUMENTS

| | | | |
|---|---|---|---|
| 2007/0109586 A1* | 5/2007 | Yamada | G06F 3/121 358/1.14 |
| 2007/0291286 A1 | 12/2007 | Utsunomiya et al. | |
| 2009/0052913 A1 | 2/2009 | Kawamura et al. | |
| 2009/0279137 A1* | 11/2009 | Mori | G06F 3/1204 358/1.15 |
| 2010/0271672 A1* | 10/2010 | Nakamichi | H04N 1/0057 358/498 |
| 2013/0120799 A1* | 5/2013 | Maeda | G06F 3/1296 358/1.15 |
| 2016/0299726 A1 | 10/2016 | Hayashi | |
| 2016/0299727 A1 | 10/2016 | Hayashi | |
| 2016/0299731 A1 | 10/2016 | Kayama | |

FOREIGN PATENT DOCUMENTS

| | | |
|---|---|---|
| JP | 2007-241648 A | 9/2007 |
| JP | 2008-110576 A | 5/2008 |

* cited by examiner

*Primary Examiner* — Saeid Ebrahimi Dehkordy
(74) *Attorney, Agent, or Firm* — Canon USA, Inc. I.P. Division

(57) ABSTRACT

At least one embodiment of a post-processing apparatus performs post-processing on a product printed by a printing apparatus, and transmits a completion notification, indicating that the post-processing apparatus has completed the post-processing, to the printing apparatus based on whether there is a subsequent post-processing apparatus to the post-processing apparatus. At least one embodiment of an image forming apparatus holds job data, performs print processing of the job data, and deletes the held job data in a case where the completion notification is received.

11 Claims, 12 Drawing Sheets

FIG.6A

```
<JMF>
    <Command ID="m.1" Type="PipePause">
        <PipeParams JobID="J1" PipeID="P2" Status="Stopped" Reason="ExceedIntendedQuantity"/>
    </Command>
</JMF>
```

FIG.6B

```
<JMF>
    <Command ID="m.1" Type="PipePush">
        <PipeParams JobID="J1" PipeID="P2" Status="InProgress">
            <Resource Class="Consumable" ID="r.1" Status="Unavailable"/>
        </PipeParams>
    </Command>
</JMF>
```

FIG.6C

```
<JMF>
    <Command ID="m.1" Type="PipePull">
        <PipeParams JobID="J1" PipeID="P2" Status="InProgress">
            <Resource Class="Consumable" ID="r.1" Status="Unavailable"/>
        </PipeParams>
    </Command>
</JMF>
```

FIG.6D

```
<JMF>
    <Command ID="C00 03" Type="PipeClose">
        <PipeParams JobID="J3" PipeID="P3" Status="Stopped" StatusDetails="Interrupt">
            <JobInfo>
                <OrderID>1234567</OrderID>
                <JobID>J2</JobID>
                <Copies>3</Copies>
                <Sheets>100</Sheets>
                <Duration>500</Duration>
            </JobInfo>
        </PipeParams>
    </Command>
</JMF>
```

FIG.7A

```
<JMF>
  <Command ID="m.1711096537._150313_130551936_000001" Type="PipeEnd">
   <PipeParams JobID="J1" PipeID="P1" UpdatedStatus="Completed">
    <Resource Class="New Value"
     ID="r.1711096537._150313_140332710_000002" Status="Unavailable"/>
   </PipeParams>
  </Command>
</JMF>
```

FIG.7B

```
<JMF>
  <Command ID="m.1711096537._150313_130551936_000001" Type="PipeClose">
   <PipeParams JobID="J1" PipeID="P1" UpdatedStatus="Partial"
    <Resource Class="New Value"
     ID="r.1711096537._150313_140332710_000002" Status="Unavailable"/>
   </PipeParams>
  </Command>
</JMF>
```

FIG.7C

```
<JMF>
  <Command ID="m.1711096537._150313_130551936_000001" Type="PipePause">
   <PipeParams JobID="J1" PipeID="P1" UpdatedStatus="Completed"/>
  </Command>
</JMF>
```

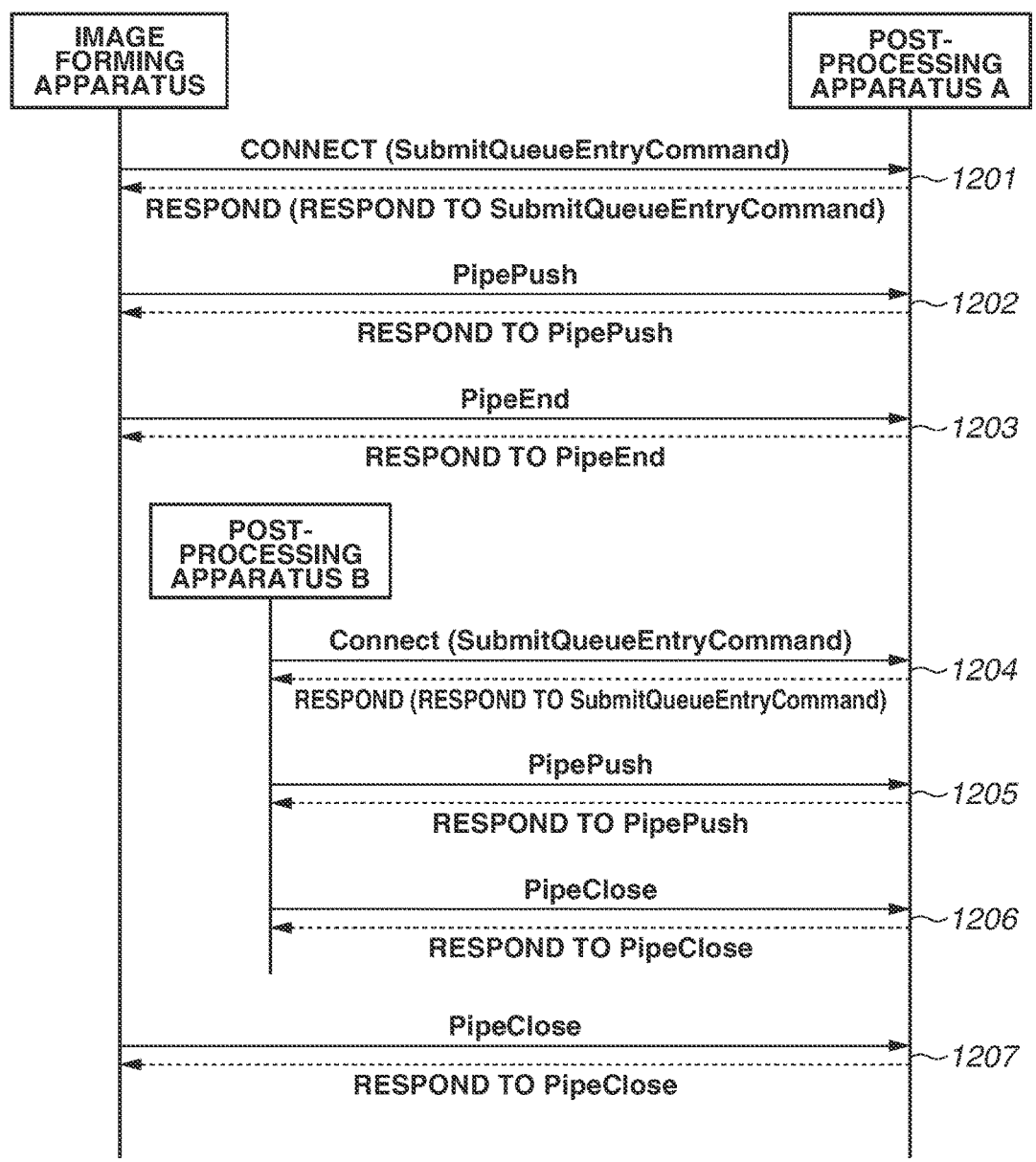

SYSTEM, AND POST-PROCESSING APPARATUS AND METHOD FOR CONTROLLING THE SAME

BACKGROUND OF THE INVENTION

Field of the Invention

The present disclosure relates to a technique for producing a product by performing post-processing on a print product output from an image forming apparatus with use of a post-processing apparatus.

Description of the Related Art

Conventionally, in the commercial printing industry, various products have been produced by combining an image forming apparatus and a post-processing apparatus. For example, an advanced product can be produced by setting a print product on the post-processing apparatus after the image forming apparatus performs print processing to output the print product, and performing post-processing (after processing), such as bookbinding and cutting, thereon.

In such a configuration, the print processing by the image forming apparatus and the post-processing by the post-processing apparatus may be performed in parallel with each other to improve productivity associated with the production. More specifically, while the print product is output from the image forming apparatus, this print product is transferred to the post-processing apparatus by being manually carried or via a conveyor belt. The post-processing apparatus produces the product by performing the post-processing on the received print product as needed.

For example, Japanese Patent Application Laid-Open No. 2007-241648 discusses a technique according to which an image forming apparatus outputs a print product and deletes data of a job for which data is printed according to an instruction from an information processing apparatus from which the print job is transmitted, after the print processing.

However, the technique discussed in Japanese Patent Application Laid-Open No. 2007-241648 does not include consideration of processing and an instruction from the post-processing apparatus that performs the post-processing on the product printed by the image forming apparatus. Therefore, for example, if two or more post-processing apparatuses perform the post-processing on the product printed by the image forming apparatus, the data should be deleted at an appropriate timing and the data otherwise should be acquired again to be reprinted by the image forming apparatus. Therefore, as a result, the productivity of an entire system is deteriorated.

SUMMARY OF THE INVENTION

The present disclosure has been made at least in part in consideration of the above-described issue, and is directed to providing a technique for reducing the deterioration in the productivity of the entire system even when the two or more post-processing apparatuses perform the post-processing on the product printed by the image forming apparatus.

According to an aspect of the present disclosure, a system includes a printing apparatus, and a plurality of post-processing apparatuses, wherein each of the post-processing apparatuses includes a post-processing unit configured to perform post-processing on a product printed by the printing apparatus, and a transmission unit configured to transmit a completion notification, indicating that the post-processing unit has completed the post-processing, to the printing apparatus based on whether there is a subsequent post-processing apparatus to the post-processing apparatus, and wherein the printing apparatus includes a holding unit configured to hold job data, a printing unit configured to perform print processing of the job data, and a deletion unit configured to delete the held job data in a case where the completion notification is received.

According to other aspects of the present disclosure, one or more additional systems, one or more printing apparatuses, one or more methods for controlling same, one or more post-processing apparatuses, one or more methods for controlling same and one or more storage mediums are discussed herein. Further features of the present disclosure will become apparent from the following description of exemplary embodiments with reference to the attached drawings.

BRIEF DESCRIPTION OF THE DRAWINGS

FIGS. 6A, 6B, 6C, and 6D each illustrate an example of a command (a message) generated by the information processing system according to the present exemplary embodiment.

FIGS. 7A, 7B, and 7C each illustrate another example of the command (the message) generated by the information processing system according to the present exemplary embodiment.

FIG. 12 is an example of a sequence diagram illustrating communication processing in the information processing system according to the present exemplary embodiment.

DESCRIPTION OF THE EMBODIMENTS

In the following description, an exemplary embodiment for the present disclosure will be described with reference to the drawings.

Figure 1:
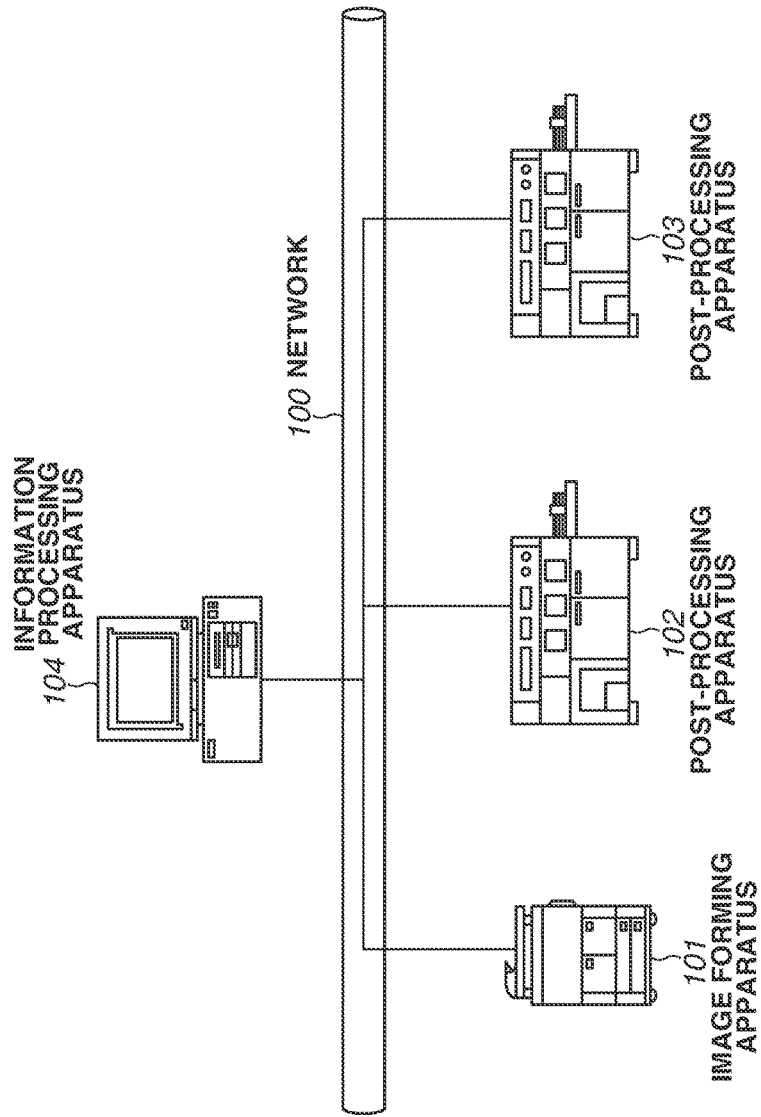
FIG. 1 illustrates a system configuration of an information processing system according to an exemplary embodiment of the present disclosure.

FIG. 1 illustrates an overall configuration of an information processing system according to an exemplary embodiment of the present disclosure. An environment of the entire information processing system, which will be described in the following description, is merely an example for facilitating understanding of the present disclosure, and the present disclosure is not limited to this environment.

In FIG. 1, an image forming apparatus 101, a post-processing apparatus 102, a post-processing apparatus 103, and an information processing apparatus 104 are connected to a network 100. The image forming apparatus 101 analyzes print data including print character data transmitted from the information processing apparatus 104 or the like, converts the print data into a dot image page by page, and prints the print data. Further, the image forming apparatus 101 communicates with the post-processing apparatus 102 and the post-processing apparatus 103 via the network 100 to transmit and receive control information and the like thereto and therefrom. A print product output from the image forming apparatus 101 is transferred to the post-processing apparatus 102 and/or the post-processing apparatus 103 by being carried manually by a print operator, or is transferred to the post-processing apparatus 102 and/or the post-processing apparatus 103 via a not-illustrated conveyor belt. The post-processing apparatus 102 and the post-processing apparatus 103 perform post-processing (after processing), such as cutting, bookbinding, and folding, on the print product output from the image forming apparatus 101. The print product output from the image forming apparatus 101 may be subjected to the post-processing performed by two or more post-processing apparatuses. For example, the print product output from the image forming apparatus 101 is subjected to the bookbinding processing performed by the post-processing apparatus 102, and then the cutting processing performed by the post-processing apparatus 103 after that. The post-processing apparatus 102 and the post-processing apparatus 103 are post-processing apparatuses that are not physically connected to the image forming apparatus 101 but are capable of communicating with the image forming apparatus 101 and the information processing apparatus 104 via the network 100. A program, such as a workflow management program, which will be described below, and program for a web server, runs on the information processing apparatus 104. Further, a printer driver program or the like, which is used for connecting the image forming apparatus 101 with the post-processing apparatus 102 via the network 100 and controlling the image forming apparatus 101, is installed in the information processing apparatus 104. FIG. 1 illustrates the information processing system as including a signal apparatus as each of the image forming apparatus 101, the post-processing apparatus 102, the post-processing apparatus 103, and the information processing apparatus 104, but the information processing system may include a plurality of apparatuses as each of them. Further, the network 100 may be the Internet, and for example, the information processing system may be configured in such a manner that the information processing apparatus 104 has Internet access to the image forming apparatus 101 and the post-processing apparatus 102 or the post-processing apparatus 103. The image forming apparatus 101 is a printing apparatus, and the post-processing apparatus 102 is a print product processing apparatus.

Figure 2:
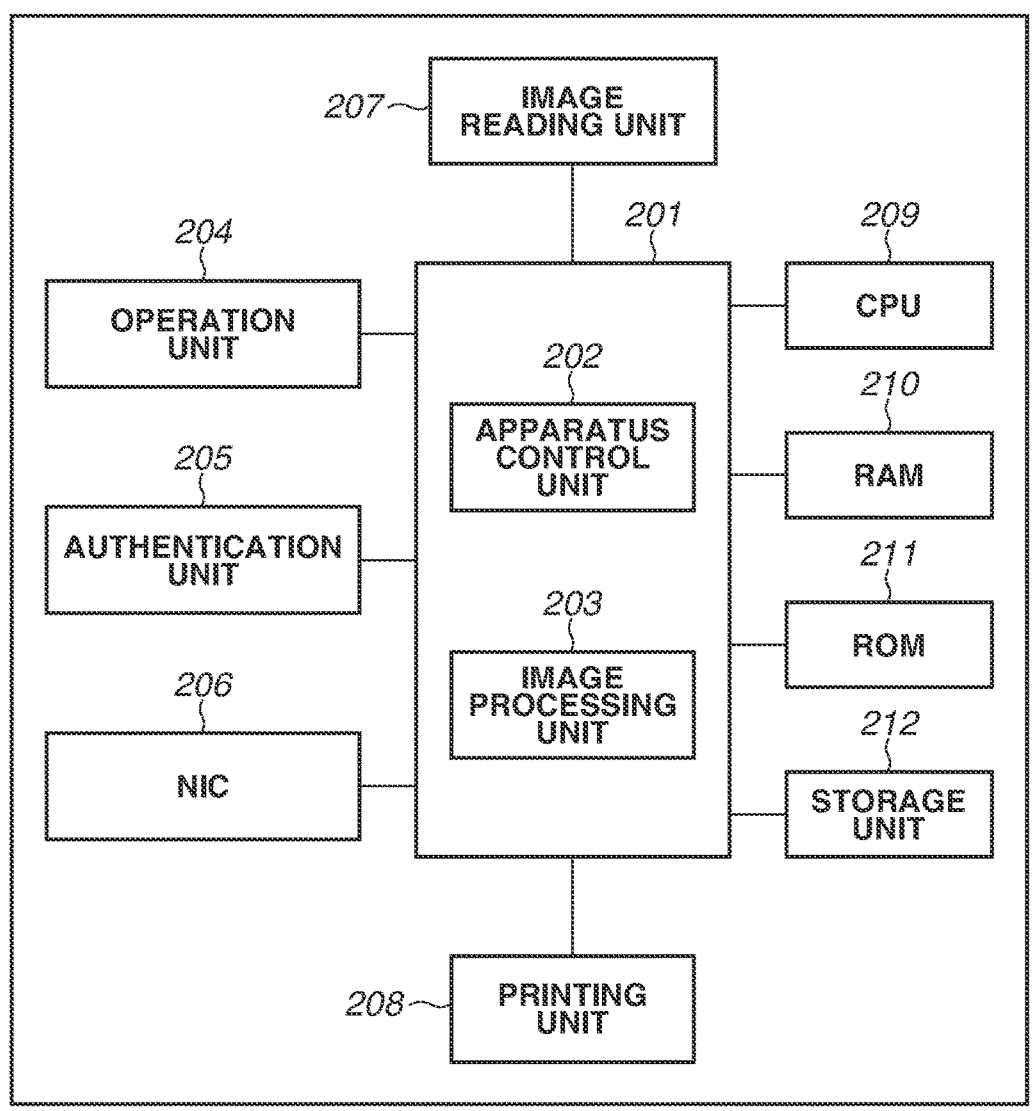
FIG. 2 is a block diagram illustrating a hardware configuration of an image forming apparatus according to the present exemplary embodiment.

FIG. 2 illustrates a hardware configuration of the image forming apparatus 101 according to the present exemplary embodiment. The image forming apparatus 101 includes an operation unit 204, an authentication unit 205, a network interface card (NIC) 206, a central processing unit (CPU) 209, a random access memory (RAM) 210, a read only memory (ROM) 211, a storage unit 212, an image reading unit 207, and a printing unit 208, which are connected to one another via a control unit 201. The control unit 201 includes an apparatus control unit 202, which controls the entire image forming apparatus 101, and an image processing unit 203, which processes image data. The operation unit 204 includes, for example, a software keyboard, a touch panel, and/or another input/output device, and can input and display various kinds of setting values. The CPU 209 executes a program stored in the ROM 211, and a program loaded from the storage unit 212 into the RAM 210, such as an application. In other words, the CPU 209 functions as each of processing units for performing processing illustrated in each of flowcharts that will be described below, by executing the program stored in a readable storage medium. The RAM 210 is a main memory of the CPU 209, and functions as a work area and the like. The image reading unit 207 includes, for example, a scanner, and can acquire a document image in the form of image data by reading a paper document or the like. The control unit 201 performs processing for providing a document image stored in the storage unit 212 to the operation unit 204 to output the document image onto the operation unit 204. Further, similarly, the control unit 201 provides the document image stored in the storage unit 212 to the printing unit 208, and the printing unit 208 performs processing for outputting the document image in various forms. For example, the printing unit 208 can perform processing for outputting image data regarding the document image into a storage medium. Alternatively, the printing unit 208 may perform processing for outputting the document image onto an output medium, such as a paper medium, as the printing unit 208 has a printing function. Further, the image forming apparatus 101 is capable of connecting to the network 100 via the NIC 206, and transmitting and receiving data. The data acquired via the NIC 206 can also be displayed on the operation unit 204.

Figure 3:
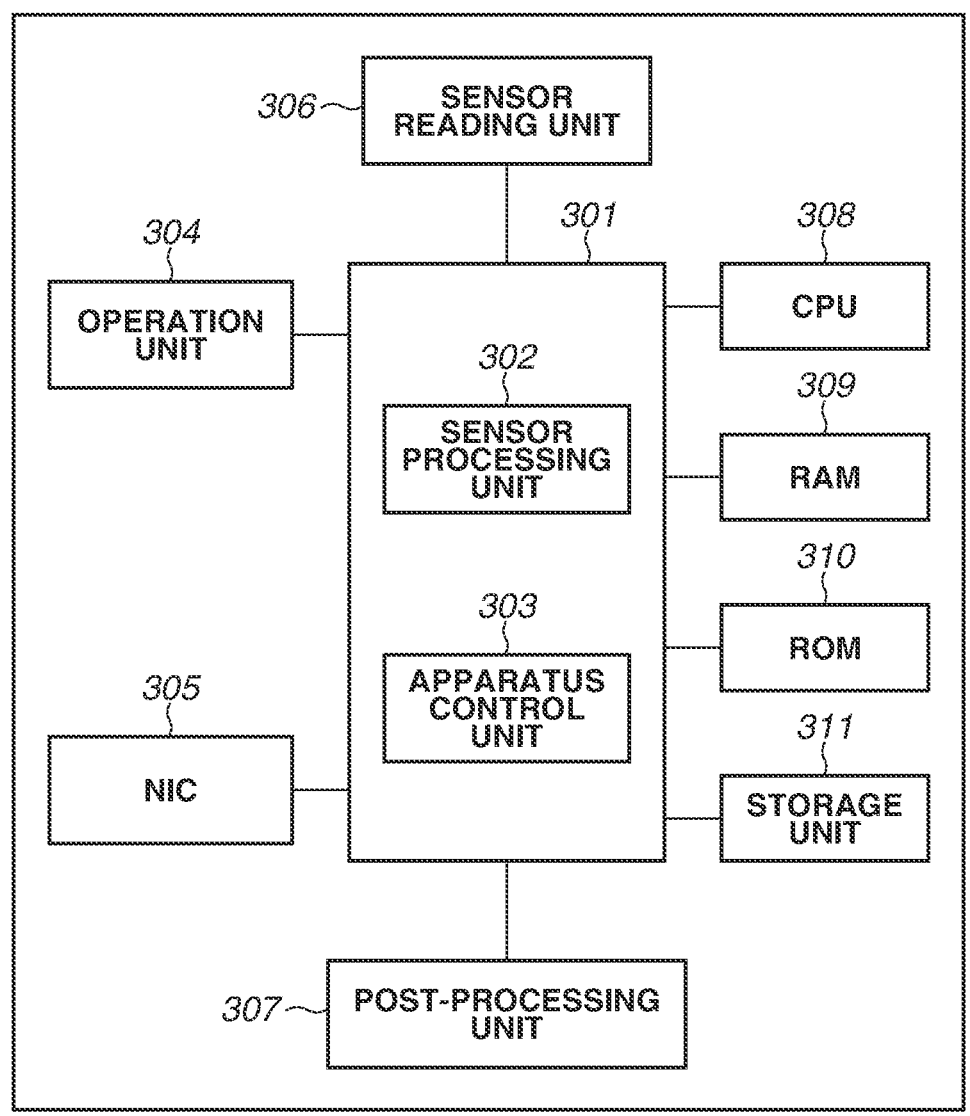
FIG. 3 is a block diagram illustrating a hardware configuration of a post-processing apparatus according to the present exemplary embodiment.

FIG. 3 illustrates a hardware configuration of the post-processing apparatus 102 (or the post-processing apparatus 103) according to the present exemplary embodiment. The post-processing apparatus 102 (or the post-processing apparatus 103) includes an operation unit 304, an NIC 305, a CPU 308, a RAM 309, a ROM 310, a storage unit 311, a sensor reading unit 306, and a post-processing unit 307, which are connected to one another via a control unit 301. The control unit 301 includes a sensor processing unit 302, which processes sensor information read by the sensor reading unit 306, and an apparatus control unit 303, which controls the entire post-processing apparatus 102 (or the entire post-processing apparatus 103). The operation unit 304 includes, for example, a software keyboard, a touch panel, and/or another input/output device, and can input and display various kinds of setting values. The CPU 308 executes a program stored in the ROM 310, and a program loaded from the storage unit 311 into the RAM 309, such as an application. In other words, the CPU 308 functions as each of processing units for performing the processing illustrated in each of the flowcharts that will be described below, by executing the program stored in a readable storage medium. The RAM 309 is a main memory of the CPU 308, and functions as a work area and the like. The sensor reading unit 306 can read job information (for example, for checking a combination of a front cover and a body of a case binding job) of a post-processing target, and the like via a device such as a camera. The control unit 301 performs processing for providing post-processing information stored in the storage unit 311 to the operation unit 304 to output information indicating a setting of the post-processing onto the operation unit 304. Further, similarly, the control unit 301 provides the post-processing information stored in the storage unit 311 to the post-processing unit 307, and the post-processing unit 307 performs the post-processing in various forms. Further, the post-processing apparatus 102 (or the post-processing apparatus 103) is capable of connecting to the network 100 via the NIC 305, and transmitting and receiving data. The data acquired via the NIC 305 can also be displayed on the operation unit 304.

Figure 4:
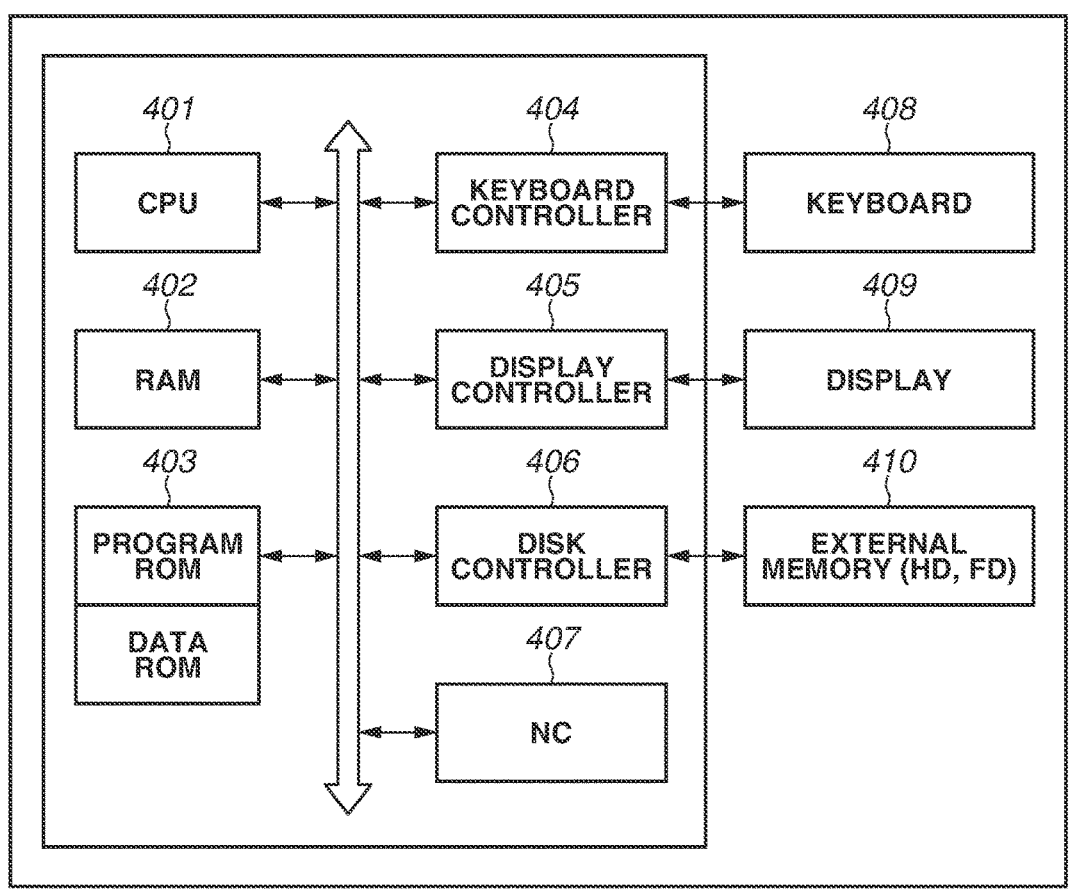
FIG. 4 is a block diagram illustrating a hardware configuration of an information processing apparatus according to the present exemplary embodiment.

FIG. 4 illustrates a hardware configuration of the information processing apparatus 104 according to the present exemplary embodiment. The information processing apparatus 104 can be implemented by using hardware of a commonly-used computer (a personal computer (PC)). In FIG. 4, a CPU 401 executes a program stored in a program ROM in a ROM 403, and a program, for example, an operating system (OS) and an application, loaded from a hard disk 410 into a RAM 402. In other words, the CPU 401 functions as each of processing units for performing the processing illustrated in each of the flowcharts that will be described below, by executing the program stored in a readable storage medium. The RAM 402 is a main memory of the CPU 401, and functions as a work area and the like. A keyboard controller 404 controls an operation input from a keyboard 408 or a not-illustrated pointing device (a mouse, a touch pad, a touch panel, a trackball, or the like). A display controller 405 controls what is displayed on a display 409. A disk controller 406 controls data access to an external memory 410, for example, a hard disk (HD) and a flexible disk (FD), storing various kinds of data. A network controller (NC) 407 is connected to the network 100, and performs processing for controlling communication with another apparatus connected to the network 100.

Figure 5A:
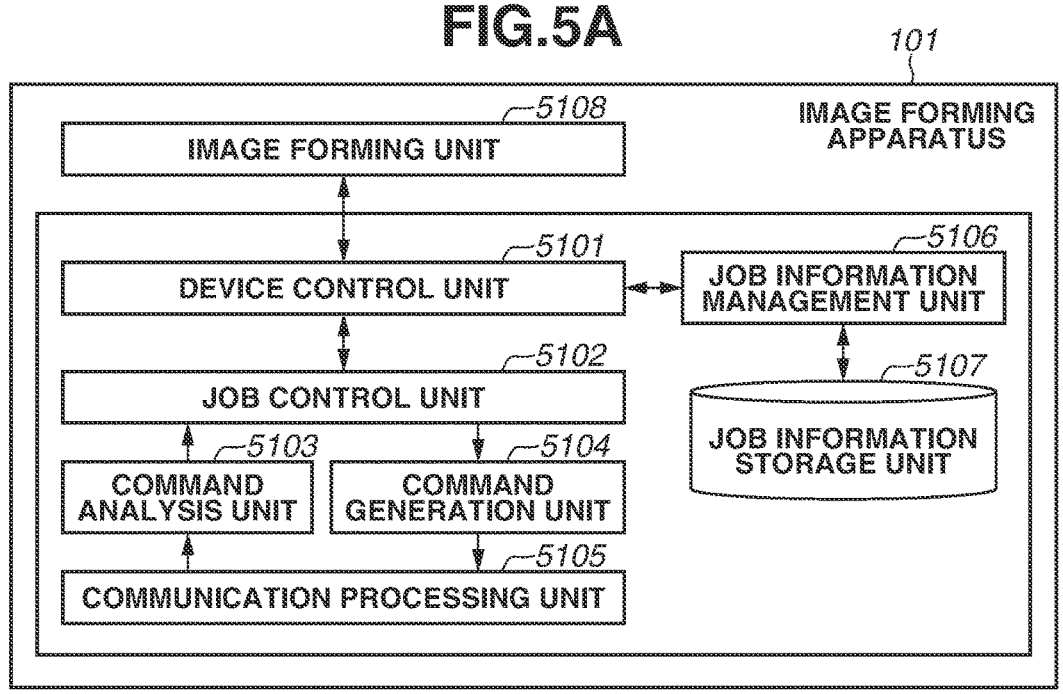
FIG. 5A is a block diagram illustrating a software configuration of the image forming apparatus according to the present exemplary embodiment.

FIG. 5A is a functional block diagram illustrating each of functions of the image forming apparatus 101. A device control unit 5101 controls an image forming unit 5108 according to a print instruction from a job control unit 5102. The job control unit 5102 performs control regarding processing a print job. More specifically, the job control unit 5102 issues an instruction regarding the print processing to the device control unit 5101 and transmits a command regarding the post-processing to the post-processing apparatus 102 (or the post-processing apparatus 103) based on print job information stored in a job information storage unit 5107 and a command received from the post-processing apparatus 102 (or the post-processing apparatus 103). A command analysis unit 5103 analyzes a command (such as commands illustrated in FIGS. 6A to 6D, which will be described below) received from the post-processing apparatus 102 (or the post-processing apparatus 103) or the information processing apparatus 104. A command generation unit 5104 generates a command (such as the commands illustrated in FIGS. 6A to 6D, which will be described below) to be transmitted to the post-processing apparatus 102 (or the post-processing apparatus 103) or the information processing apparatus 104. A communication processing unit 5105 carries out data communication with the post-processing apparatus 102 (or the post-processing apparatus 103) and the information processing apparatus 104. A job information management unit 5106 manages the print job information stored in the job information storage unit 5107. The job information storage unit 5107 stores the information regarding the print job, based on which the image forming apparatus 101 performs the print processing. The image forming unit 5108 is a processing mechanism that performs the print processing.

Figure 5B:
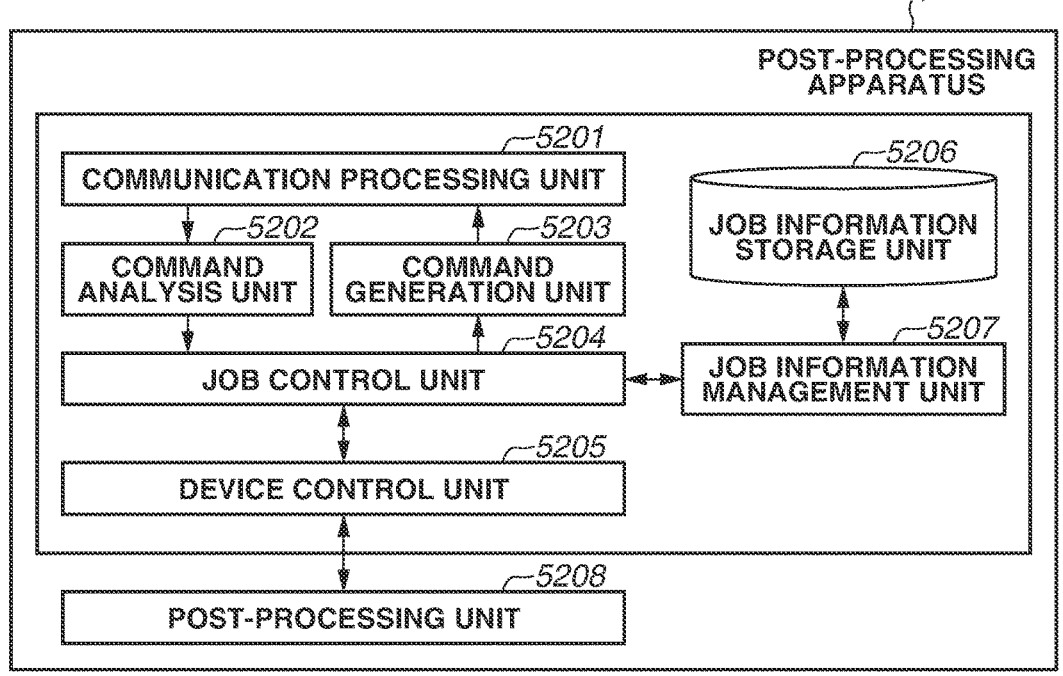
FIG. 5B is a block diagram illustrating a software configuration of the post-processing apparatus according to the present exemplary embodiment.

FIG. 5B is a functional block diagram illustrating each of functions of the post-processing apparatus 102 (or the post-processing apparatus 103). A communication processing unit 5201 carries out data communication with the image forming apparatus 101 and the information processing apparatus 104. A command analysis unit 5202 analyzes a command (such as the commands illustrated in FIGS. 6A to 6D, which will be described below) received from the image forming apparatus 101 or the information processing apparatus 104. A command generation unit 5203 generates a command (such as the commands illustrated in FIGS. 6A to 6D, which will be described below) to be transmitted to the image forming apparatus 101 or the information processing apparatus 104. A job control unit 5204 performs control regarding processing a post-processing job for which the post-processing apparatus 102 (or the post-processing apparatus 103) performs the post-processing. More specifically, the job control unit 5204 issues an instruction regarding the post-processing to a device control unit 5205 and transmits a command regarding the print processing to the image forming apparatus 101 based on information about the post-processing job stored in a job information storage unit 5206 and the command received from the image forming apparatus 101. The device control unit 5205 controls a post-processing unit 5208 according to a print instruction from the job control unit 5204. The job information storage unit 5206 stores the information regarding the post-processing job, based on which the post-processing apparatus 102 (or the post-processing apparatus 103) performs the post-processing. The information about the post-processing also includes instruction information indicating what kind of post-processing should be performed for each job. For example, if the post-processing is set to the case binding, the information about the post-processing includes information, such as sheet sizes, sheet types, and finishing sizes of the front cover and the body. These pieces of information are received from the information processing apparatus 104 or the like in advance, or input by the operator from the operation unit 304 of the post-processing apparatus 102 (or the post-processing apparatus 103). A job information management unit 5207 manages the information about the post-processing job stored in the job information storage unit 5206. The post-processing unit 5208 is a processing mechanism that performs the post-processing.

FIGS. 6A to 6D are diagrams each illustrating an example of a format of the command (message) generated by the command generation unit 5104 of the image forming apparatus 101 and the command generation unit 5203 of the post-processing apparatus 102 in the information processing system according to the present exemplary embodiment.

FIG. 6B illustrates a command that allows an apparatus to notify a communication partner that the processing of this apparatus itself is started (a "Push" command). More specifically, the apparatus transfers a product produced by this apparatus itself to the communication partner, and instructs the communication partner to process the received product. For example, the image forming apparatus 101 can transfer the print product to the post-processing apparatus 102, and instruct the post-processing apparatus 102 to perform the post-processing.

FIG. 6A illustrates a command for temporarily stopping the processing performed by the communication partner (a "Pause" command). For example, the post-processing apparatus 102 can instruct the image forming apparatus 101 to stop the print processing by transmitting this command to the image forming apparatus 101.

FIG. 6C illustrates a command for instructing the communication partner to produce the product (a "Pull" command). For example, the post-processing apparatus 102 can instruct the image forming apparatus 101 to print the print data by transmitting this command to the image forming apparatus 101.

FIG. 6D illustrates a command for notifying the communication partner of an end of the processing (a "Close" command). For example, the image forming apparatus 101 can notify the post-processing apparatus 102 that the image forming apparatus 101 has ended printing the print data for the job currently in process by transmitting this command to the post-processing apparatus 102.

FIGS. 7A to 7C are diagrams each illustrating a command for notifying the communication partner of an end of a processing portion. The post-processing apparatus 102 can notify the image forming apparatus 101 that the processing for the job currently in process has been partially ended by transmitting this command to the image forming apparatus 101.

An example illustrated in FIG. 7A expresses the command for notifying the communication partner of the end of the processing portion with use of an "End" command. In an example illustrated in FIG. 7B, a command itself is configured as the command (the "Close" command), but specifies UpdatedStatus="Partial" in a PipeParams element. By specifying the element in this manner, this command indicates that the current status is not a complete end, in which all post-processing procedures have been ended, but is a partial end, in which the post-processing procedures are partially left unperformed. In an example illustrated in FIG. 7C, a command itself is configured as the command (the "Pause" command), but indicates that the current status is the partial end by specifying UpdatedStatus="Completed" in the PipeParams element.

FIG. 12 is a sequence diagram illustrating an example of a flow of processing in which the image forming apparatus 101, the post-processing apparatus 102, and the post-processing apparatus 103 communicate with one another with use of the commands (the messages) illustrated in FIGS. 6A to 6D and 7A to 7C in the information processing system according to the present exemplary embodiment. In this sequence diagram, the post-processing apparatus 102 and the post-processing apparatus 103 correspond to a post-processing apparatus A and a post-processing apparatus B, respectively. The present sequence is an example in which the product printed by the image forming apparatus 101 is subjected to, for example, the bookbinding processing performed by a bookbinding apparatus (the post-processing apparatus A), and the product processed by the bookbinding processing is subject to, for example, the cutting processing performed by a cutting apparatus (the post-processing apparatus B).

In FIG. 12, in step 1201, the command generation unit 5104 of the image forming apparatus 101 generates a command (a connection command) for establishing a connection to the post-processing apparatus 102 which is to perform the post-processing for a target job, and transmits the generated command via the communication processing unit 5105, when the image forming apparatus 101 starts the print processing. More specifically, the image forming apparatus 101 transmits a job ticket for the post-processing to the post-processing apparatus 102. The command generated and transmitted in step 1201 triggers a start of the connection between the image forming apparatus 101 and the post-processing apparatus 102. Upon receiving the command, the command analysis unit 5202 of the post-processing apparatus 102 analyzes the received command, and transmits a result thereof (acceptance or rejection of the connection) to the image forming apparatus 101.

In step 1202, the image forming apparatus 101 notifies the post-processing apparatus A of an output of the print product (that a resource is output) by transmitting an output notification command (the "Push" command), which is the command illustrated in FIG. 6B, to the post-processing apparatus A. In the present exemplary embodiment, the image forming apparatus 101 transmits the "Push" command for each print product (hereinafter expressed as a "resource") that corresponds to one unit to be processed by the post-processing. The post-processing apparatus A performs the post-processing on the received resource. Upon receiving the command, the command analysis unit 5202 of the post-processing apparatus A analyzes the received command, and transmits a result thereof (acceptance or rejection) to the image forming apparatus 101.

Upon ending the post-processing on the print product, in step 1203, the post-processing apparatus A transmits the command, which is illustrated in any of FIGS. 7A to 7C, for notifying the communication partner of the end of the processing portion. The communication partner is notified of this command under such a situation that the processing of the post-processing apparatus A has been ended but the processing of the post-processing apparatus B is still in progress. Upon receiving the command, the command analysis unit 5103 of the image forming apparatus 101 analyzes the received command, and transmits a result thereof (acceptance or rejection) to the post-processing apparatus A.

In step 1204, the post-processing apparatus A transmits the command (the connection command) for establishing a connection to the post-processing apparatus B to the subsequent post-processing apparatus B for causing the post-processing apparatus B to start the further post-processing on the post-processed product. Upon receiving the command, the command analysis unit 5202 of the post-processing apparatus B analyzes the received command, and transmits a result thereof (acceptance or rejection) to the post-processing apparatus A.

In step 1205, the post-processing apparatus A notifies the post-processing apparatus B of an output of the post-processed product (that the resource is output) by transmitting the output notification command (the "Push" command) to the post-processing apparatus B. Upon receiving the command, the command analysis unit 5202 of the post-processing apparatus B analyzes the received command, and transmits a result thereof (acceptance or rejection) to the post-processing apparatus A.

In step 1206, the post-processing apparatus B transmits the "Close" command, which indicates that the post-processing apparatus B ends the current connection, to the post-processing apparatus A because the post-processing apparatus B has completed the post-processing on all resources. Upon receiving the command, the command analysis unit 5202 of the post-processing apparatus A analyzes the received command, and transmits a result thereof (acceptance or rejection) to the post-processing apparatus B.

In step 1207, the post-processing apparatus A transmits the "Close" command to the image forming apparatus 101 according to the reception of the "Close" command from the post-processing apparatus B. Upon receiving the command, the command analysis unit 5103 of the image forming apparatus 101 analyzes the received command, and transmits a result thereof (acceptance or rejection) to the post-processing apparatus A.

Figure 8:
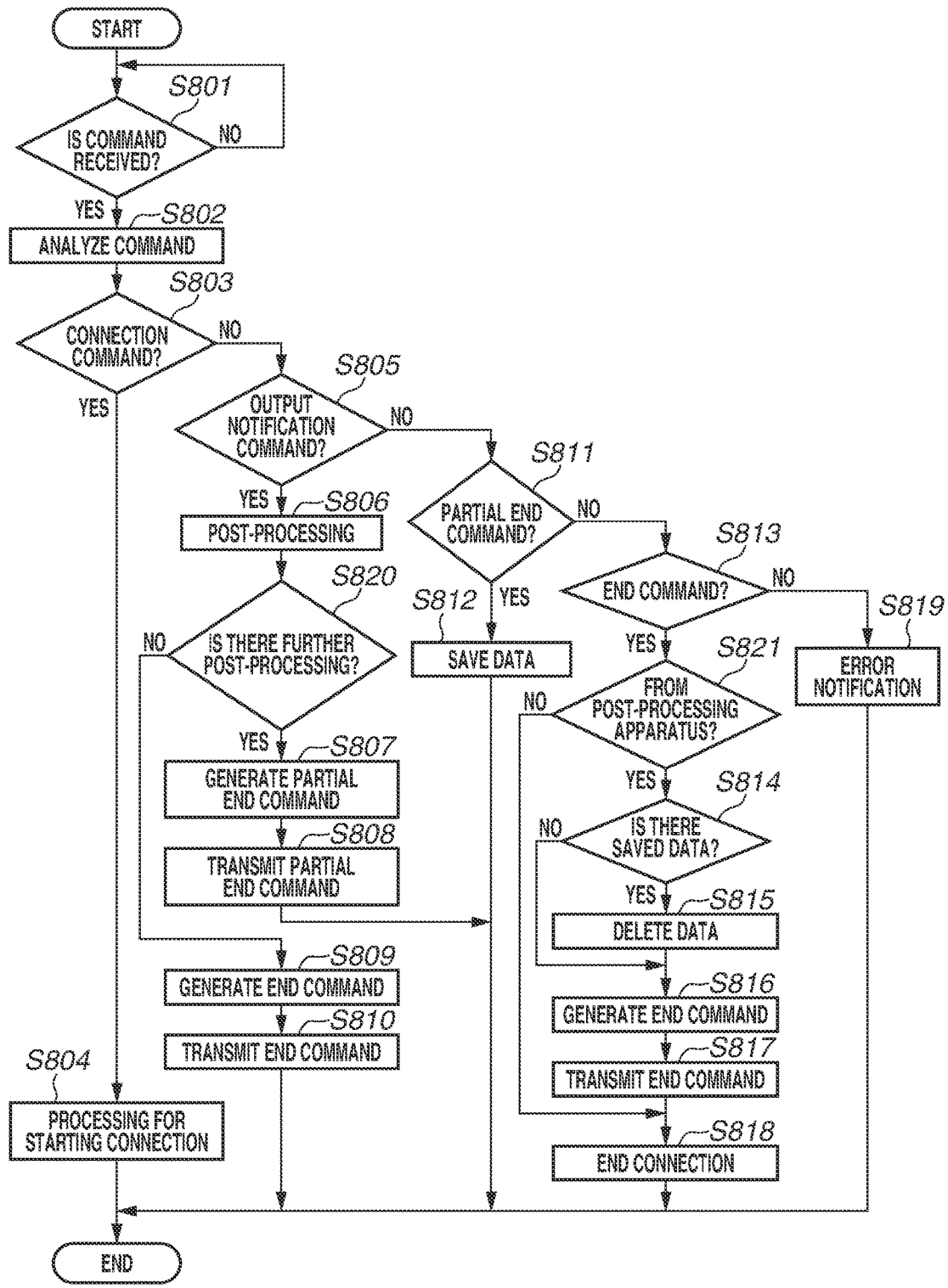
FIG. 8 illustrates a flow of processing performed by the post-processing apparatus according to the present exemplary embodiment.

FIG. 8 illustrates a flow from a time of when the post-processing apparatus 102 according to the present exemplary embodiment receives the command (the message) from another apparatus until a time of when the post-processing apparatus 102 performs the processing according to the command. The program regarding each flow is stored in the storage unit 311 of the post-processing apparatus 102, and is read into the RAM 309 to be executed by the CPU 308.

In step S801, the communication processing unit 5201 determines whether the command (the message) is received. In a case where the communication processing unit 5201 determines that the command is received (YES in step S801), the processing proceeds to step S802. In step S802, the command analysis unit 5202 analyzes the received command (the message). In step S803, the command analysis unit 5202 determines whether the received command is the connection command. In a case where the command analysis unit 5202 determines that the received command is the connection command (YES in step S803), the processing proceeds to step S804. In a case where the command analysis unit 5202 determines that the received command is not the connection command (NO in step S803), the processing proceeds to step S805.

In step S804, the communication processing unit 5201 performs processing for starting the connection for the communication with the image forming apparatus 101. More specifically, the communication processing unit 5201, for example, secures a memory for the communication, generates a queue for receiving a job, registers the job information, and establishes a session for the communication. As the establishment of the session for the communication, the communication processing unit 5201 establishes the communication based on PipeID written in the connection command.

In step S805, the command analysis unit 5202 determines whether the analyzed command is the output notification command (the "Push" command). In a case where the command analysis unit 5202 determines that the analyzed command is the output notification command (YES in step S805), the processing proceeds to step S806. In a case where the command analysis unit 5202 determines that the analyzed command is not the output notification command (NO in step S805), the processing proceeds to step S811. In step S806, the job control unit 5204 instructs the device control unit 5205 to perform the post-processing, thereby causing the post-processing unit 5208 to perform the post-processing. The post-processing is performed with use of the job ticket.

In step S820, the job control unit 5204 determines, with use of the job ticket, whether there is the post-processing that should be performed by another post-processing apparatus as subsequent processing. In a case where the job control unit 5204 determines that there is the subsequent post-processing (YES in step S820), the processing proceeds to step S807. In a case where the job control unit 5204 determines that there is not the subsequent post-processing (NO in step S820), the processing proceeds to step S809.

In step S807, the command generation unit 5203 generates a partial end command (any of the commands illustrated in FIGS. 7A to 7C). In step S808, the communication processing unit 5201 transmits the partial end command generated in step S807 to the image forming apparatus 101. In step S809, the command generation unit 5203 generates an end command (the "Close" command). In step S810, the communication processing unit 5201 transmits the end command generated in step S809 to the image forming apparatus 101.

In step S811, the command analysis unit 5202 determines whether the analyzed command is the partial end command (any of the commands illustrated in FIGS. 7A to 7C). In a case where the command analysis unit 5202 determines that the analyzed command is the partial end command (YES in step S811), the processing proceeds to step S812. In a case where the command analysis unit 5202 determines that the analyzed command is not the partial end command (NO in step S811), the processing proceeds to step S813. In step S812, the job control unit 5204 instructs the job information management unit 5207 to save the data of the job currently in process. The job information management unit 5207 records a job identification (ID), a pipe ID, and the like into the job information storage unit 5206, thereby preparing for reprocessing. Further, the job control unit 5204 makes preparations for reception of a next job.

In step S813, the command analysis unit 5202 determines whether the analyzed command is the end command (the "Close" command). In a case where the command analysis unit 5202 determines that the analyzed command is the end command (YES in step S813), the processing proceeds to step S821. In a case where the command analysis unit 5202 determines that the analyzed command is not the end command (NO in step S813), the processing proceeds to step S819.

In step S821, the command analysis unit 5202 determines whether the end command analyzed in step S813 is the command received from the subsequent post-processing apparatus. More specifically, the command analysis unit 5202 determines whether the end command analyzed in step S813 is the command received from the post-processing apparatus that further performs the post-processing on the product post-processed by the post-processing apparatus 102. The command analysis unit 5202 makes this determination by referring to a source from which the command is received.

In step S814, the job control unit 5204 inquires about whether job data corresponding to the job ID and the pipe ID of the command analyzed in step S802 is stored in the job information management unit 5207. In a case where there is the saved data (YES in step S814), the processing proceeds to step S815. In a case where there is not the saved data (NO in step S814), the processing proceeds to step S816.

In step S815, the job control unit 5204 causes the job information management unit 5207 to perform processing for releasing the job data, the presence of which has been confirmed in step S814 (delete the data).

In step S816, the command generation unit 5203 generates the end command (the "Close" command). In step S817, the communication processing unit 5201 transmits the end command generated in step S816 to the image forming apparatus 101. In step S818, the communication processing unit 5201 ends the connection with the image forming apparatus 101. Further, the job control unit 5204 waits for the end of the post-processing performed by the post-processing unit 5208. Upon the end of the post-processing, the job control unit 5204 notifies the device control unit 5205 of the end of the post-processing (a completion notification), and deletes the job information from the job information storage unit 5206. In step S819, the image forming apparatus 101 is notified that the command analysis unit 5202 has failed in the analysis, via the communication processing unit 5201.

Figure 9:
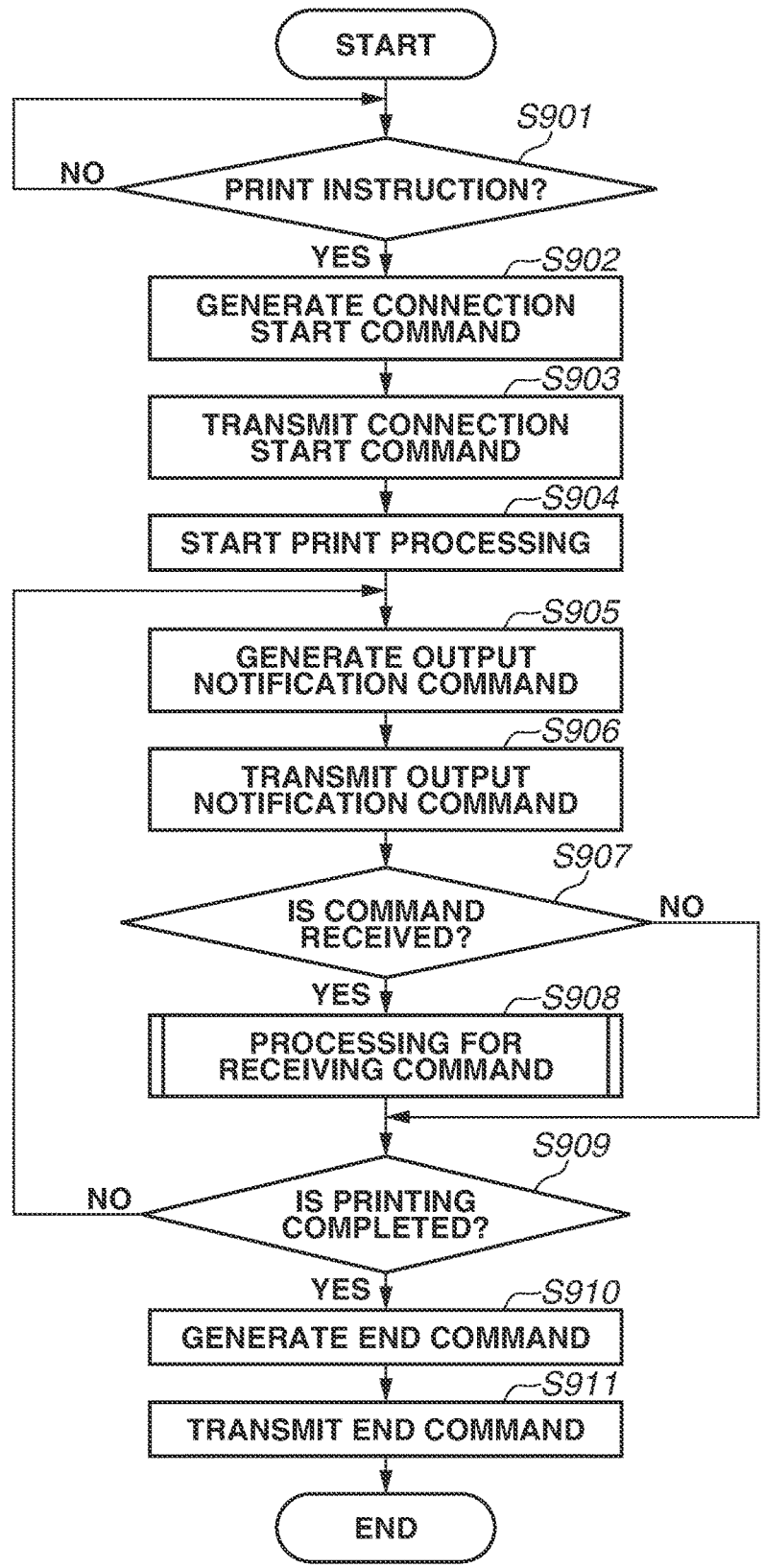
FIG. 9 illustrates a flow of processing performed by the image forming apparatus according to the present exemplary embodiment.

FIG. 9 illustrates a flow from a time of when the image forming apparatus 101 according to the present exemplary embodiment starts the print processing until a time of when the image forming apparatus 101 ends the print processing. The program regarding each flow is stored in the storage unit 212 of the image forming apparatus 101, and is read into the RAM 210 to be executed by the CPU 209.

In step S901, the job control unit 5102 determines whether the print instruction is received based on reception of the print job from another apparatus via the communication processing unit 5105 or based on an operation input onto the operation unit 204. The print job is received from, for example, the information processing apparatus 103 or the post-processing apparatus 102. In a case where the job control unit 5102 determines that the print instruction is received (YES in step S901), the processing proceeds to step S902. In step S902, the command generation unit 5104 generates the connection start command for carrying out the communication. In step S903, the image forming apparatus 101 transmits the connection start command generated by the command generation unit 5104 in step S902 to the apparatus that is the communication destination via the communication processing unit 5105. In the present exemplary embodiment, the apparatus that is the communication destination, which is described with reference to FIG. 9, is the post-processing apparatus 102.

In step S904, the job control unit 5102 causes the image forming unit 5112 to start the print processing via the device control unit 5101. For example, the print processing is sequentially performed for each unit of the product (for example, one copy at a time). In step S905, the command generation unit 5104 generates the command (the "Push" command) for notifying the apparatus that is the communication destination that the image forming apparatus 101 has started the print processing. In step S906, the image forming apparatus 101 transmits the command (the "Push" command) generated by the command generation unit 5104 in step S905 to the apparatus that is the communication destination via the communication processing unit 5105.

In step S907, the communication processing unit 5105 determines whether the command (the message) is received. In a case where the communication processing unit 5105 determines that the command is received (YES in step S907), the processing proceeds to step S908. In step S908, the communication processing unit 5105 performs processing for receiving the command illustrated in FIG. 10. In step S909, the job control unit 5102 determines whether the image forming apparatus 101 has completed processing all of print jobs with respect to which the instruction has been received (for example, whether the image forming apparatus 101 has completed printing all copies). In a case where the job control unit 5102 determines that the image forming apparatus 101 has completed processing all of the print jobs (YES in step S909), the processing proceeds to step S910. In a case where the job control unit 5102 determines that there is still the print job left to be processed (NO in step S909), the processing proceeds to step S905 (for example, the image forming apparatus 101 performs the print processing of a next copy).

In step S910, the command generation unit 5104 generates the command indicating the end of the processing (the "Close" command). In step S911, the image forming apparatus 101 transmits the command (the "Close" command) generated by the command generation unit 5104 in step S910 to the apparatus that is the communication destination via the communication processing unit 5105.

Figure 10:
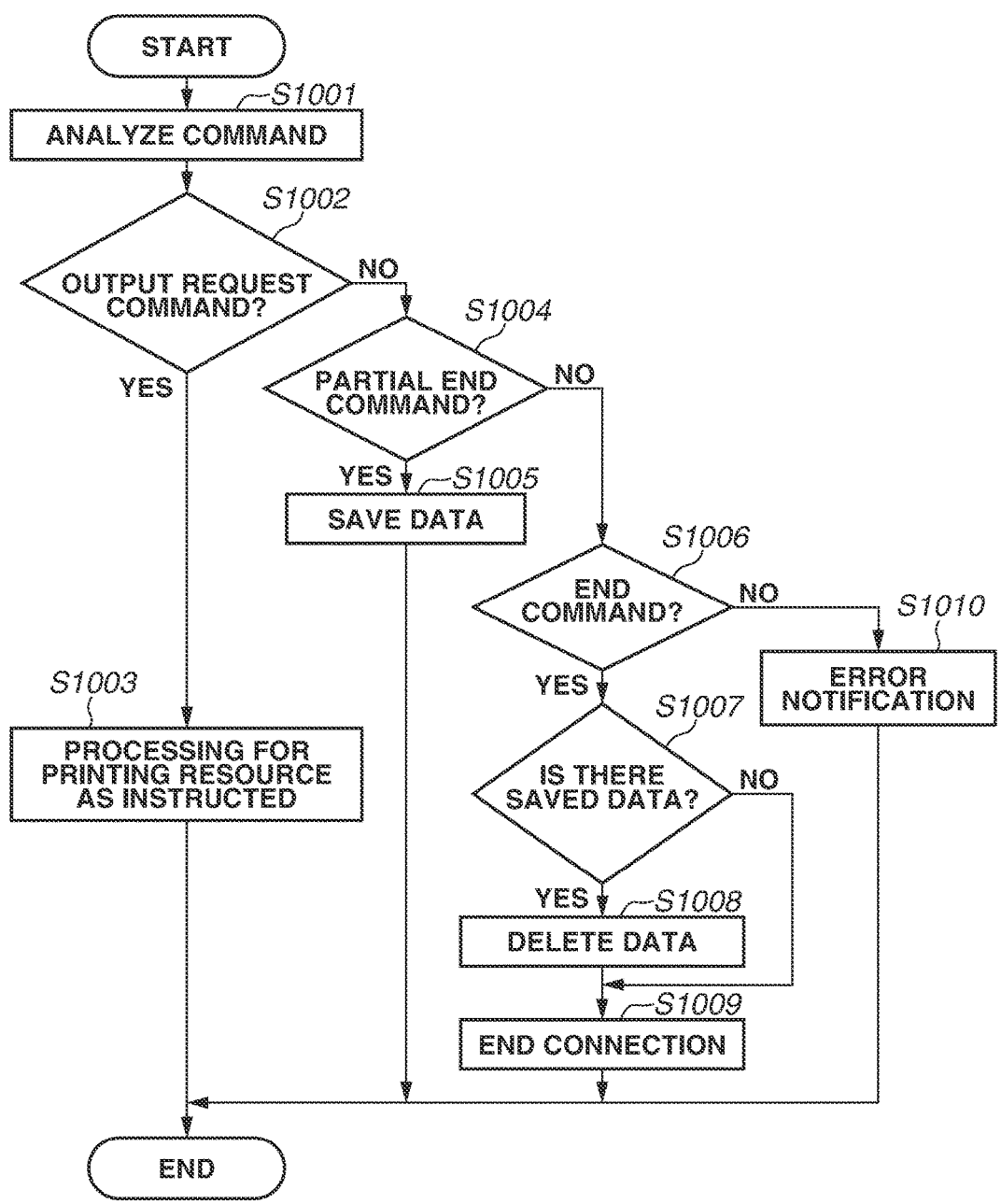
FIG. 10 illustrates a detailed flow of step S908 illustrated in FIG. 9.

FIG. 10 illustrates a flow of processing for receiving the command in step S908 illustrated in FIG. 9. The program regarding each flow is stored in the storage unit 212 of the image forming apparatus 101, and is read into the RAM 210 to be executed by the CPU 209.

In step S1001, the command analysis unit 5103 analyzes the received command (the message).

In step S1002, the command analysis unit 5103 determines whether the analyzed command is an output command ("Pull"). In a case where the command analysis unit 5103 determines that the analyzed command is the output command (YES in step S1002), the processing proceeds to step S1003. In a case where the command analysis unit 5103 determines that the analyzed command is not the output command (NO in step S1002), the processing proceeds to step S1004.

In step S1003, the job control unit 5102 causes the image forming unit 5108 to perform the print processing via the device control unit 5101.

In step S1004, the command analysis unit 5103 determines whether the analyzed command is the partial end command ("End"). In a case where the command analysis unit 5103 determines that the analyzed command is the partial end command (YES in step S1004), the processing proceeds to step S1005. In a case where the command analysis unit 5103 determines that the analyzed command is not a temporary stop command (NO in step S1004), the processing proceeds to step S1006.

In step S1005, the job control unit 5102 instructs the device control unit 5101 to store the data of the job currently in process. Upon receiving the instruction, the device control unit 5101 further notifies the job information management unit 5106 of the instruction to store the data. Then, the job information management unit 5106 stores the job ID, the pipe ID, data after being processed by a raster image processor (RIP), and the like into the job information storage unit 5107 to prepare for reprinting. The information indicating the job ID and the pipe ID is stored to allow the image forming apparatus 101 to confirm which job and which pipe the data of the print job is associated with. The job ID and the pipe ID are the same information as the job ID and the pipe ID specified in the "Push" command and the "Pull" command illustrated in FIGS. 6C and 6B, respectively.

In step S1006, the command analysis unit 5103 determines whether the analyzed command is the end command ("Close"). In a case where the command analysis unit 5103 determines that the analyzed command is the end command (YES in step S1006), the processing proceeds to step S1007. In a case where the command analysis unit 5103 determines that the analyzed command is not the end command (NO in step S1006), the processing proceeds to step S1010. In step S1007, the job control unit 5102 determines whether data corresponding to the job ID and the pipe ID written in the end command is stored in the job information storage unit 5107. In a case where the job control unit 5102 determines that the job control unit 5102 determines that this data is stored in the job information storage unit 5107 (YES in step S1007), the processing proceeds to step S1008. In a case where the job control unit 5102 determines that the job control unit 5102 determines that this data is not stored in the job information storage unit 5107 (NO in step S1007), the processing proceeds to step S1009. In step S1008, the job control unit 5102 instructs the device control unit 5101 to release the job data, the presence of which has been confirmed in step S1007. Upon receiving the instruction, the device control unit 5101 instructs the job information management unit 5106 to release the job data, and the job information management unit 5106 releases the data of the job recorded in the job information storage unit 5107 (deletes the data).

In step S1009, the communication processing unit 5105 ends the connection with the apparatus to which the image forming apparatus 101 is currently connected. Further, the job control unit 5102 waits for the end of the print processing performed by the image forming unit 5108, and notifies the device control unit 5101 of the end of the print processing upon the end of the print processing. In step S1010, the apparatus to which the image forming apparatus 101 is currently connected is notified that the command analysis unit 5103 has failed in the analysis via the communication processing unit 5105.

Figure 11:
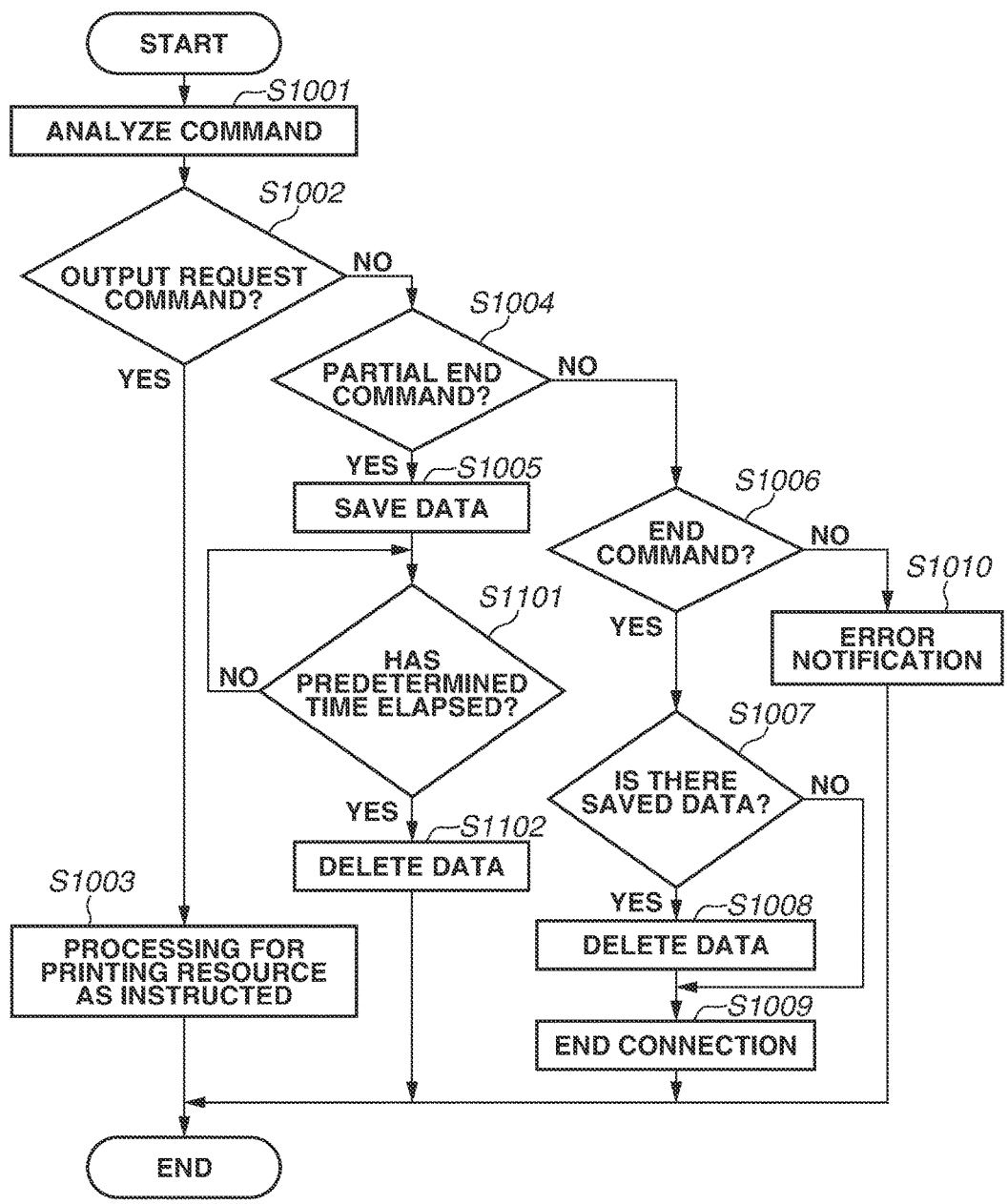
FIG. 11 illustrates another detailed flow of step S908 illustrated in FIG. 9.

FIG. 11 illustrates another flow of the processing for receiving the command in step S908 illustrated in FIG. 9. In the following description, only different steps from FIG. 10 will be described.

In step S1101, the job control unit 5102 determines whether a predetermined time has elapsed since the saving of the data in step S1005. In a case where the job control unit 5102 determines that the job control unit 5102 determines that the predetermined time has elapsed (YES in step S1101), the processing proceeds to step S1102.

In step S1102, the job control unit 5102 performs the processing for releasing the job data that is the saved data managed by the job information management unit 5106 (deletes the data).

According to the processing illustrated in FIG. 11, the saved data can be deleted at an appropriate timing even when it takes a long time until the reception of the end command.

Regarding the above-described saving of the data, the data may be saved in any manner as long as the apparatus can keep therein data that allows the apparatus to perform the reprocessing (the reprinting). For example, a location where the data is stored may be any location as long as this location is inside the apparatus. Further, the saved data may be any of Portable Document Format (PDF) data, a PostScript (PS) command (a page description language (PDL)), and the data after being processed by the RIP.

Further, the partial end command has been described based on the example in which the apparatus transmits this command when the processing of this apparatus itself has been entirely completed, but may be used for the apparatus to notify the communication partner of a progress of the processing performed by this apparatus itself still in the middle of the processing. For example, if being supposed to perform the post-processing on one hundred copies, the post-processing apparatus 102 or 103 notifies the image forming apparatus 101 that the post-processing apparatus 102 or 103 has completed the post-processing on fifty copies upon completing the post-processing on the fifty copies. The image forming apparatus 101 can delete the data that is no longer necessary based on the information indicating that the post-processing apparatus 102 or 103 has completed the post-processing on the fifty copies. For example, this alternative is effective in terms of a reduction in the data at the time of printing variable data in which the data varies per print product.

Further, although the transmission of the partial end command to the image forming apparatus 101 can realize further fine control, the post-processing apparatus 102 or 103 may transmit only the end notification without transmitting the partial end command. For example, the end notification is transmitted to the image forming apparatus 101 when the processing of the last apparatus has been entirely completed, regardless of the completion of the processing performed by the apparatus that has the apparatus subsequent thereto. Then, the image forming apparatus 101 deletes the data upon receiving this end notification.

Further, the above-described exemplary embodiment has been described based on the example in which the post-processing is performed by the two post-processing apparatuses 102 and 103, but the present disclosure can also be applied even when the post-processing is performed by three or more post-processing apparatuses.

According to the above-described exemplary embodiment, the print data no longer has to be transmitted again for reprinting, whereby deterioration in work efficiency can be reduced.

Further, the above-described exemplary embodiment allows the information processing system to separately control a period of time during which the resource required for the reprocessing is held and the connection between the apparatuses. Therefore, the upstream apparatus, which has ended the processing, can be prevented from being kept occupied in a state waiting for the end of the processing performed by the downstream apparatus, whereby an operation rate can be increased.

Further, the detection of the end of the entire job allows the data to be held until the end of the job, whereby it also becomes possible to efficiently respond to a request for the reprocessing.

According to the above-described exemplary embodiment, the deterioration in the productivity of the entire system can be reduced even in a case where the two or more post-processing apparatuses perform the post-processing on the product printed by the image forming apparatus.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2015-081161, filed Apr. 10, 2015, No. 2016-044984, filed Mar. 8, 2016, which are hereby incorporated by reference herein in their entirety.

What is claimed is:

1. A system comprising:
a printing apparatus; and
a plurality of post-processing apparatuses,
wherein each of the post-processing apparatuses includes:
at least one processor configured to
perform post-processing on a product printed by the printing apparatus;
determine whether subsequent post-processing is to be performed by a subsequent one of the post-processing apparatuses on the post-processed printed product or not, said subsequent post-processing apparatus being connected to, and following, the post-processing apparatus;
transmit a completion notification that indicates completion of processing to the printing apparatus upon the completion of the post-processing in a case where it is determined that no subsequent post-processing is to be performed by the subsequent post-processing apparatus connected to, and following, the post-processing apparatus on the post-processed printed product; and
transmit a partial completion notification that indicates completion of a part of processing to the printing apparatus upon the completion of the post-processing in a case where it is determined that subsequent post-processing is to be performed by the subsequent post-processing apparatus connected to, and following, the post-processing apparatus on the post-processed printed product; and
wherein the printing apparatus includes:
a storage configured to hold job data,
a printer configured to perform print processing of the job data, and
at least one processor configured to delete the held job data in a case where the completion notification is received and not to delete the held job data in a case where the partial completion notification is received.

2. The system according to claim 1,
wherein the at least one processor of the post-processing apparatus is configured to transmit the completion notification to the printing apparatus in a case where the completion notification that indicates the completion of the processing is received from the subsequent post-processing apparatus connected to and following the post-processing apparatus.

3. The system according to claim 2,
wherein, in a case where the completion notification that indicates the completion of the processing is received from the subsequent post-processing apparatus connected to and following the post-processing apparatus and where job data is held, the at least one processor of the post-processing apparatus is configured to allow the job data to be deleted.

4. The system according to claim 1,
wherein the at least one processor of the printing apparatus is configured to delete the held job data in a case where the partial completion notification is received and where a predetermined time has elapsed after receiving the partial completion notification.

5. A post-processing apparatus comprising:
at least one processor configured to:
perform post-processing on a product printed by a printing apparatus;
determine whether subsequent post-processing is to be performed by a subsequent post-processing apparatuses on the post-processed printed product or not, the subsequent post-processing apparatus being connected to, and following, the post-processing apparatus;
transmit a completion notification that indicates completion of processing to the printing apparatus upon completion of the post-processing in a case where it is determined that no subsequent post-processing is to be performed by the subsequent post-processing apparatus connected to, and following, the post-processing apparatus on the post-processed printed product; and
transmit a partial completion notification that indicates completion of a part of processing to the printing apparatus upon the completion of the post-processing in a case where it is determined that subsequent post-processing is to be performed by the subsequent post-processing apparatus connected to, and following, the post-processing apparatus on the post-processed printed product.

6. The apparatus according to claim 5,
wherein the at least one processor is configured to transmit the completion notification to the printing apparatus in a case where the completion notification that indicates the completion of the processing is received from the subsequent post-processing apparatus connected to, and following, the post-processing apparatus.

7. The apparatus according to claim 6,
wherein, in a case where the completion notification that indicates the completion of the processing is received from the subsequent post-processing apparatus connected to, and following, the post-processing apparatus and where job data is held, the at least one processor is configured to allow the job data to be deleted.

8. A method for controlling a post-processing apparatus, the method comprising:
performing post-processing on a product printed by a printing apparatus;
determining whether subsequent post-processing is to be performed by a subsequent post-processing apparatuses on the post-processed printed product, the subsequent post-processing apparatus being connected to, and following, the post-processing apparatus;
transmitting a completion notification that indicates completion of processing to the printing apparatus upon completion of the post-processing in a case where it is determined that no subsequent post-processing is to be performed by the subsequent post-processing apparatus connected to, and following, the post-processing apparatus on the post-processed printed product; and
transmitting a partial completion notification that indicates completion of a part of processing to the printing apparatus upon the completion of the post-processing in a case where it is determined that subsequent post-processing is to be performed by the subsequent post-processing apparatus connected to, and following, the post-processing apparatus on the post-processed printed product.

9. The method according to claim 8, further comprising
transmitting the completion notification to the printing apparatus in a case where the completion notification that indicates the completion of the processing is received from the subsequent post-processing apparatus connected to and following the post-processing apparatus.

10. The method according to claim 9, further comprising:
in a case where the completion notification that indicates the completion of the processing is received from the subsequent post-processing apparatus connected to and following the post-processing apparatus and where job data is held, allowing the job data to be deleted.

11. A non-transitory computer-readable storage medium storing a program for causing a computer to execute a method for controlling a post-processing apparatus, the method comprising:

performing post-processing on a product printed by a printing apparatus;

determining whether subsequent post-processing is to be performed by a subsequent post-processing apparatuses on the post-processed printed product, the subsequent post-processing apparatus being connected to, and following, the post-processing apparatus;

transmitting a completion notification that indicates completion of processing to the printing apparatus upon completion of the post-processing in a case where it is determined that no subsequent post-processing is to be performed by the subsequent post-processing apparatus connected to, and following, the post-processing apparatus on the post-processed printed product; and transmitting a partial completion notification that indicates completion of a part of processing to the printing apparatus upon the completion of the post-processing in a case where it is determined that subsequent post-processing is to be performed by the subsequent post-processing apparatus connected to, and following, the post-processing apparatus on the post-processed printed product.

* * * * *